United States Patent Office 3,642,897
Patented Feb. 15, 1972

3,642,897
PREPARATION OF 2-ALKYLAMINOBENZO-
PHENONES
Goetz E. Hardtmann, Florham, N.J., assignor to Sandoz-
Wander, Inc., Hanover, N.J.
No Drawing. Filed Dec. 26, 1968, Ser. No. 787,255
Int. Cl. C07c 85/00
U.S. Cl. 260—570                                  8 Claims

ABSTRACT OF THE DISCLOSURE

The invention discloses preparation of 2-alkylamino-benzophenones involving reaction of a 3-aryl-2,1-benzisoxazole with an alkyl halide.

---

The present invention relates to novel process for preparation of 2-alkylaminobenzophenones.

In accordance with the invention a 2-alkylaminobenzo-phenone of the Formula I:

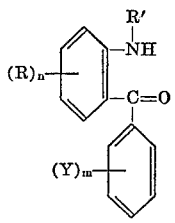

wherein

R is halo of atomic weight of from 19 to 80; lower alkyl, preferably of 1 to 3 carbon atoms, e.g., methyl; or lower alkoxy, preferably of 1 to 2 carbon atoms;
R' is lower alkyl of 1 to 6 carbon atoms, e.g., methyl, ethyl, propyl, and isopropyl (but defined herein as excluding alkyl in which the alpha carbon atom is a tertiary carbon atom, e.g., tert.-butyl);
n is 0 to 2, and when 2 then R is the same or different;
Y is halo of atomic weight of from 19 to 80; lower alkyl, preferably of 1 to 3 carbon atoms; or lower alkoxy, preferably of 1 to 2 carbon atoms; and
m is 0 to 2, and when 2 then Y is the same or different;

is prepared by subjecting a 3-aryl-2,1-benzisoxazole of the Formula II;

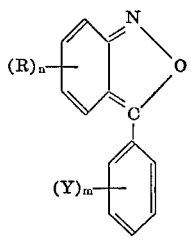

wherein R, n, Y and m are as above-defined to reaction with an alkyl halide of Formula III:

XR'.                III wherein R' is as defined and X is iodo or bromo, preferably iodo, at elevated temperatures in a suitable reaction medium.

The process of the invention may be conveniently carried out in a liquid reaction medium at elevated temperatures in the range of from 50° C. to 200° C., preferably 80° C. to 150° C. The reaction medium may be conveniently and preferably provided by an excess amount of the alkyl halide of Formula III. The reaction may be suitably carried out at reflux temperatures when compound III is a liquid at such temperatures. In situations in which compound III is normally gaseous or a vapor at the desired reaction temperature, it is usually convenient to carry out the reaction under pressure sufficient to maintain the reactants in the liquid phase, for example, by carrying out the reaction in a sealed vessel. However, any of several of the conventional organic solvents provide a suitable inert reaction medium and may be employed. The 2-alkylaminobenzophenone reaction product may be recovered or isolated from the reaction mixture, as desired, by conventional procedures.

The process of the invention may be carried out as abovedescribed to produce compounds I in which R' is either a straight-chain lower alkyl or a branched alkyl including those branched alkyl in which the branching occurs on the alpha carbon atom, i.e., the carbon atom attached to the 2-amino nitrogen of the compounds of Formula I or correspondingly the carbon atom attached to the halogen designated X in the compound of Formula III, e.g. the compounds of Formulae I and III in which R' is isopropyl. In producing the compounds I in which R' is an alkyl with branching on the alpha carbon atom, it is generally preferred to employ an acid binding agent which may be of conventional type, preferably an alkali metal carbonate, e.g. potassium carbonate. However, when producing compounds I in which R' is other than an alkyl branched on the alpha carbon atom, it has been found desirable to carry out the reaction in the substantial absence of an acid binding agent. For example, when employing a compound III in which R' is methyl the use of the usual amount of an acid binding agent results in the production of the unwanted 2-dimethylaminobenzophenone. In the absence of a binding agent the same reaction produces a mixture of the dimethyl and monomethyl products from which the desired 2-monomethyl-amino-benzophenone may be recovered in good yields. It is noteworthy that when R' in Formula III is isopropyl the reaction produces the 2-monoisopropylamino-benzo-phenone in high yield and to the substantial exclusion of any diisopropylamino product.

The 3-aryl-benzisoxazoles of Formula II are either known or may be prepared from known materials by established procedures, for example, as described by R. B. Davis et al., J. Org. Chem. 25, 1884 (1960) and F. Korte et al., Ann. Chem. 621, 51 (1959).

In general, the compounds of Formula I prepared in accordance with this invention are useful as intermediates for the preparation of corresponding 1-alkyl-4-aryl-2(1H)-quinazolinones of Formula IV by the following reaction scheme:

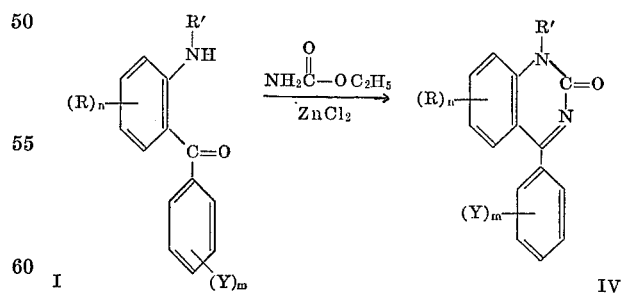

wherein R, n, Y and m are as previously defined.

In accordance with the above process, a 2-alkylamino-benzophenone of Formula I is reacted with ethyl carbamate in the presence of a catalytic amount of a Lewis acid, e.g., zinc chloride, and at elevated temperatures. Preferably, the reaction is effected at a temperature of from about 160° C. to about 200° C. If desired, the reaction may be carried out in the presence of a suitable inert organic solvent of well known type. However, the use of a solvent is not necessary since an excess of the carbamate can be used for this purpose.

Alternately, the 2-alkylaminobenzophenones of Formula I may be converted to the corresponding 2-alkylaminobenzophenonimine by a known method involving reacting said compound I with ammonia under anhydrous conditions at elevated pressures and temperatures in the range of 100° C. to 200° C., preferably 110° to 150° C., and preferably in the presence of a Lewis acid such as zinc chloride. The 2-alkylaminobenzophenonimines are then converted to a corresponding 1-alkyl-2(1H)-quinazolinone of Formula IV by cyclization of the 2-alkylaminobenzophenonimine with phosgene at temperatures in the range of 0° C. to 50° C., preferably 10° C. to 30° C. in an organic solvent such as an aromatic hydrocarbon, e.g. benzene, toluene and the like. The cyclization of a benzophenonimine with phosgene is well adapted for producing compounds IV in which R' is a branched alkyl with the branching occurring on the carbon atom attached to the ring nitrogen.

The 1-alkyl-2(1H)quinazolinones of Formula IV obtained from the compounds produced in accordance with the process of this invention are useful because they possess pharmacological activity in animals. In particular, such compounds are useful as anti-inflammatory agents as indicated by the carrageenan-induced edema test on rats, and the antagonism of bradykinin-induced broncho-constriction of the guinea pig. For such use, the compounds of Formula IV may be formulated and administered in a conventional manner. Thus, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned use, the dosage administered will, of course, vary depending upon the compound used and mode of administration. However, in general, satisfactory results are obtained with compounds of Formula IV when administered at a daily dosage of from about .15 milligrams to about 100 milligrams per kilogram of body weight, preferably given in divided doses 2 to 4 times a day, or in sustained release form. For most mammals, the administration of from 10 milligrams to about 1,000 milligrams of the compound per day provides satisfactory results and dosage forms suitable for internal administration comprise from about 3.5 milligrams to about 500 milligrams of the compound in admixture with a solid or liquid pharmaceutical carrier or diluent. A representative formaulation is a tablet prepared by conventional tabletting techniques and containing, by weight, 50 parts of 7-methyl-1-isopropyl-4-phenyl-2(1H)-quinazolinone, 2 parts of tragacanth, 39.5 parts of lactose, 5 parts of corn starch, 3 parts of talcum and 0.5 part of magnesium stearate.

The 2-alkylaminobenzophenones of Formula I in which R' is isopropyl may be employed as mild anti-inflammatory agents as indicated by the ability of such compounds to lessen swelling in the carrageenan-induced edema test on rats (oral administration). For such use these compounds may be administered at daily dosages of from 10 mg. to 200 mg. per kilogram of animal body weight. For most mammals the administration of from 500 to 10,000 milligrams per day is suitable and dosage forms for internal administration comprise from 125 to 5,000 milligrams of the compound in admixture with a solid or liquid pharmaceutical carrier or diluent of conventional type, preferably adopted for oral administration.

From a biological activity standpoint the 2-isopropylaminobenzophenones also exhibit a marked antibradykinin activity as demonstrated on intravenous administration to the guinea pig, for example, in doses of from 150 to 5,000 micrograms per kilogram of body weight.

The following examples illustrate the preparation of representative compounds utilizing the process of this invention. However, it is to be understood that the examples are for purposes of illustration only and are not intended as in any way limiting the scope of the invention.

EXAMPLE 1

5-chloro-2-isopropylamino-4-methylbenzophenone

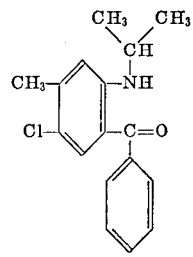

Step A: Preparation 5-chloro-6-methyl-3-phenyl-2,1-benzisoxazole.—A mixture of 10 g. of 4-chloro-3-methylnitrobenzene, 7.3 g. of phenylacetonitrile and 75 g. of potassium hydroxide in 250 ml. of methanol is stirred for 16 hours at room temperature. The reaction mixture is poured onto 1.0 liter of ice water, filtered and the resulting precipitate crystallized from diethyl ether/pentane (1:1) to obtain 5 - chloro-6-methyl-3-phenyl-2,1-benzisoxazole, M.P. 110–113° C.

Step B: Preparation 5-chloro-2-isopropylamino-4-methylbenzophenone.—A mixture of 7 g. of 5-chloro-6-methyl-3-phenyl-2,1-benzisoxazole, 25 ml. of isopropyliodide and 1.5 g. of potassium carbonate is refluxed for 3 days, then poured onto ice water and extracted three times each with 50 ml. of chloroform. The organic phases are combined, dried, filtered and the filtrate evaporated in vacuo. The residue is purified by dissolving in benzene and filtering through silica gel to obtain a yellow oil of 5-chloro-2-isopropylamino-4-methylbenzophenone. I.R. analysis of this product is methylene chloride shows NH absorption at 3200 cm.$^{-1}$ and CO absorption at 1620 cm.$^{-1}$.

EXAMPLE 1a

The 5-chloro-2-isopropylamino-4-methylbenzophenone obtained from Step B of Example 1 is subjected to catalytic hydrogenation for 20 hours in methanol at room temperature employing palladium supported on charcoal in the presence of aqueous potassium hydroxide to obtain 2-isopropylamino-4-methylbenzophenone which on I.R. analysis in methylene chloride shows NH absorption at 3200 cm.$^{-1}$ and CO absorption at 1620 cm.$^{-1}$.

EXAMPLE 1b 1-isopropyl-7-methyl-4-phenyl-2(1H)-quinazolinone

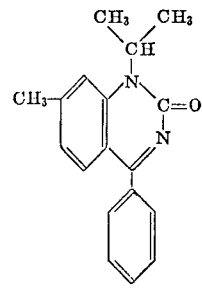

A mixture of 5.9 g. of 2-isopropylamino-4-methylbenzophenone prepared in Example 1a, above, 13.9 g. of urethane and 500 milligrams of zinc chloride is heated at a temperature of 190° C. for 1½ hours. There is then additionally added 7 g. of urethane and 250 milligrams of zinc chloride, and the heating continued at a temperature of 190° C. for an additional 2½ hours. The resulting mixture is cooled to about 100° C. and diluted with chloroform. The resulting mixture is then filtered and the filtrate washed first with water and then with brine. The organic phase is separated, dried over anhydrous sodium sulfate and concentrated in vacuo to remove substantially all of the chloroform and obtain an oily residue which is dissolved in a small amount of about 20 ml. of methylene chloride. The resulting solution is then diluted with about 40 ml. of ethyl acetate and concentrated in vacuo to crystallize 1-isopropyl-7-methyl-4-phenyl-2(1H)-quinazolinone; M.P. 137–138° C.

EXAMPLE 2

5-chloro-2-isopropylaminobenzophenone

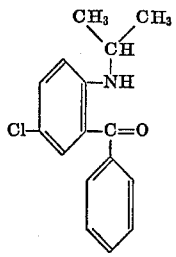

Step A: Preparation of 5-chloro-3-phenyl-2,1-benzoxazole. Following the procedure of Step A of Example 1, and employing equivalent amounts, 4-chloronitrobenzene is reacted with phenylacetonitrile to obtain 5-chloro-3-phenyl-2,1-benzisoxazole, M.P. 114–116° C. (crystallization from methanol).

Step B: Preparation of 5-chloro-2-isopropylaminobenzophenone. Following the procedure of Step B of Example 1, and employing equivalent amounts, 5-chloro-3-phenyl-2,1-benzoisoxazole is reacted with isopropyliodide to obtain an oil of 5-chloro-2-isopropylaminbenzophenone. I.R. analysis of this product in methylene chloride shows NH at 3200 cm.$^{-1}$ and CO absorption at 1620 cm.$^{-1}$.

EXAMPLE 2a 6-chloro-1-isopropyl-4-phenyl-2(1H)-quinazolinone

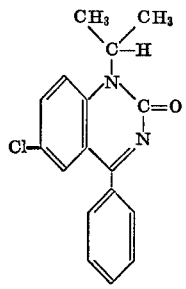

A mixture of 10 g. of 5-chloro-2-isopropylaminobenzophenone, 20 g. of urethane and 1 g. of zinc chloride is heated for 2 hours at 180–200° C. (oil bath). The resulting mixture is cooled to room temperature and then there is added thereto 200 ml. of methylene chloride. The resulting mixture is filtered and the filtrate extracted twice with 100 ml. (each) of water. The organic phase is dried over anhydrous sodium sulfate and evaporated in vacuo. The residue is crystallized from acetone and dried for 48 hours at 45° C. in high vacuum to obtain 6-chloro-1-isopropyl-4-phenyl-2(1H)-quinazolinone, M.P. 149–150° C.

EXAMPLE 3

5-chloro-2-methylbenzophenone

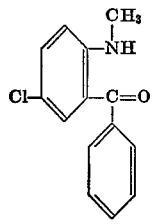

A mixture of 2 g. of 5-chloro-3-phenyl-2,1-benzisoxazole and 50 ml. methyl iodide is heated in a sealed cylinder at 100° C. for 19 hours. The mixture is then cooled and evaporated in vacuo. The residue is dissolved in methylene chloride, extracted first with sodium thiosulfate solution and then with water. After addition of some methanol (about half as much as the methylene chloride) the solution is treated with charcoal, filtered and evaporated in vacuo to dryness. The residue is chromatographed on silicagel with benzene, the first cut evaporated in vacuo to remove benzene and the residue crystallized from pentane to obtain 5-chloro-2-methylaminobenzophenone, M.P. 89–91° C. The chromatography also yielded a minor portion of 5-chloro-2-dimethylaminobenzophenone in the benzene eluent.

The word "lower" as used herein in association with such terms as "lower alkyl," "lower alkoxy," and the like shall be taken as indicating an organic substituent of from 1 to 6 carbon atoms, inclusive, unless otherwise defined herein.

What is claimed is:

1. A process for preparing an o-alkylaminobenzophenone of the formula:

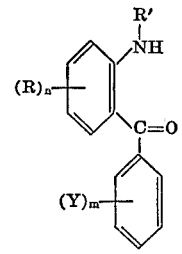

wherein

R is halo; lower alkyl; or lower alkoxy;
R' is lower alkyl;
n is 0 to 2, and when 2 then R is the same or different;
Y is halo; lower alkyl; and lower alkoxy; and
m is 0 to 2, and when 2 then Y is the same or different, said process comprising subjecting a 3-aryl-2,1-benzisoxazole of the formula:

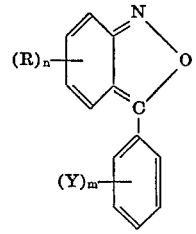

wherein R, n, Y and m are as above-defined, to reaction with an alkyl halide of the formula:

XR' wherein R' is as defined and X is halo of atomic weight of from 79 to 127, in an organic reaction medium at a temperature in the range of from 50° C. to 200° C.

2. The process of claim 1 in which R' is a straight-chain alkyl or a branched alkyl in which the branching occurs on a carbon atom other than the carbon atom attached to the halo atom of alkyl halide and in which X is iodo.

3. The process of claim 2 in which R' is a straight-chain alkyl.

4. The process of claim 3 in which R' is methyl.

5. The process of claim 2 in which the reaction temperature is in the range of from 80° C. to 150° C.

6. The process of claim 1 in which R' is a branched alkyl in which the branching occurs on the carbon atom attached to the halo atom of the alkyl halide and in which X is iodo.

7. The process of claim 6 in which R' is isopropyl.

8. The process of claim 7 in which the reaction temperature is in the range of from 80° C. to 150° C.

References Cited

UNITED STATES PATENTS

| | | | |
|---|---|---|---|
| 3,112,291 | 11/1963 | Anderson | 260—307 X |
| 3,322,764 | 5/1967 | Metlesics et al. | 260—570 X |
| 3,352,877 | 11/1967 | Den Hollenden | 260—570 X |

ROBERT V. HINES, Primary Examiner

U.S. Cl. X.R.

260—251 QB, 307 D, 566; 424—251, 330